United States Patent
Yokota

(10) Patent No.: US 9,597,946 B2
(45) Date of Patent: Mar. 21, 2017

(54) DOOR FRAME AND METHOD FOR MANUFACTURING SAME

(71) Applicant: SHIROKI CORPORATION, Fujisawa-shi (JP)

(72) Inventor: Kazuyoshi Yokota, Gamagori (JP)

(73) Assignee: SHIROKI CORPORATION, Fujisawa-Shi, Kanagawa (JP)

( * ) Notice: Subject to any disclaimer, the term of this patent is extended or adjusted under 35 U.S.C. 154(b) by 0 days.

(21) Appl. No.: 14/402,671

(22) PCT Filed: May 14, 2013

(86) PCT No.: PCT/JP2013/063457
§ 371 (c)(1),
(2) Date: Nov. 20, 2014

(87) PCT Pub. No.: WO2013/176004
PCT Pub. Date: Nov. 28, 2013

(65) Prior Publication Data
US 2015/0108785 A1    Apr. 23, 2015

(30) Foreign Application Priority Data
May 23, 2012   (JP) .................. 2012-117162

(51) Int. Cl.
*B60J 5/00*   (2006.01)
*B60J 5/04*   (2006.01)
(Continued)

(52) U.S. Cl.
CPC ............. *B60J 5/0402* (2013.01); *B23K 31/02* (2013.01); *B60J 5/0408* (2013.01); *B60J 5/0483* (2013.01);
(Continued)

(58) Field of Classification Search
CPC ...... B60J 5/0402; B60J 5/0408; B60J 5/0483; B62D 65/06; B23K 31/02; B23K 2201/006
(Continued)

(56) References Cited

U.S. PATENT DOCUMENTS

2010/0115851 A1* 5/2010 Nakao ................... B60R 13/04
49/502

FOREIGN PATENT DOCUMENTS

| JP | 58-057463 U | 4/1983 |
| JP | 63-180419 U | 11/1988 |

(Continued)

OTHER PUBLICATIONS

International Search Report (ISR) (PCT Form PCT/ISA/210), in PCT/JP2013/063457, dated Aug. 6, 2013.
(Continued)

*Primary Examiner* — Joseph D Pape
(74) *Attorney, Agent, or Firm* — McGinn IP Law Group, PLLC.

(57) ABSTRACT

The problem to be solved is to provide a door frame and a method of manufacturing the same, with reducing manufacturing cost. A door frame has a rear sash (vertical sash) (41) for supporting door glass and has a lock-device mounting bracket (door-frame component) (70) attached by welding to the rear sash (41) and having formed therein through-holes (70*e*, 70*d*) for welding. Weld beads (73, 75) are formed between the rear sash (41) and the wall surfaces of the through-holes (70*e*, 70*d*) for welding, the through-holes (70*e*, 70*d*) being formed in the lock-device mounting bracket (70).

8 Claims, 6 Drawing Sheets

(51) Int. Cl.
*B23K 31/02* (2006.01)
*B62D 65/06* (2006.01)
(52) U.S. Cl.
CPC ........ *B62D 65/06* (2013.01); *B23K 2201/006* (2013.01)
(58) Field of Classification Search
USPC .............. 296/146.5, 146.6; 49/502; 29/897.2
See application file for complete search history.

(56) References Cited

FOREIGN PATENT DOCUMENTS

| | | |
|---|---|---|
| JP | 11-129758 A | 5/1999 |
| JP | 2002-036880 A | 2/2002 |
| JP | 2002-154326 A | 5/2002 |
| JP | 2005-053288 A | 3/2005 |
| JP | 2007-223406 A | 9/2007 |
| JP | 4396343 B2 | 1/2010 |
| JP | 2010-221971 A | 10/2010 |

OTHER PUBLICATIONS

Japanese Office Action dated Aug. 2, 2016 with an English translation thereof.
Chinese Office Action dated Sep. 19, 2016 with an English translation thereof.

\* cited by examiner

FIG.8
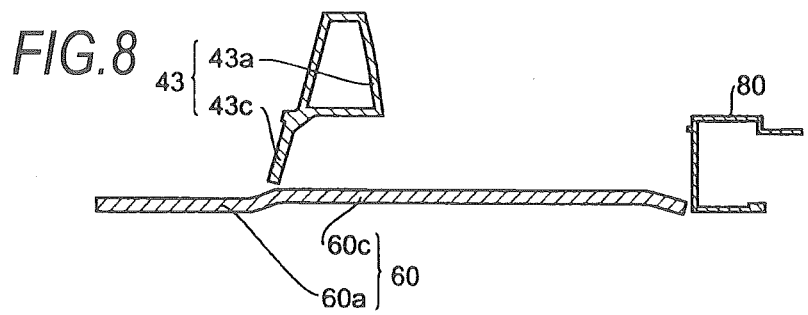
FIG.9
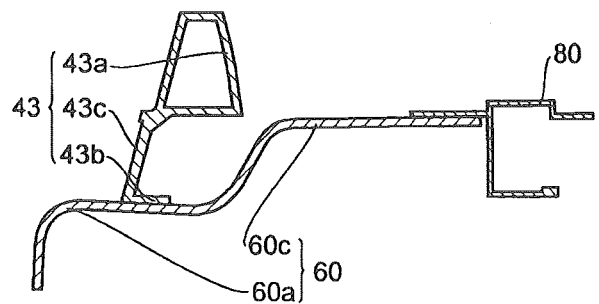
FIG.10 -BACKGROUND ART-
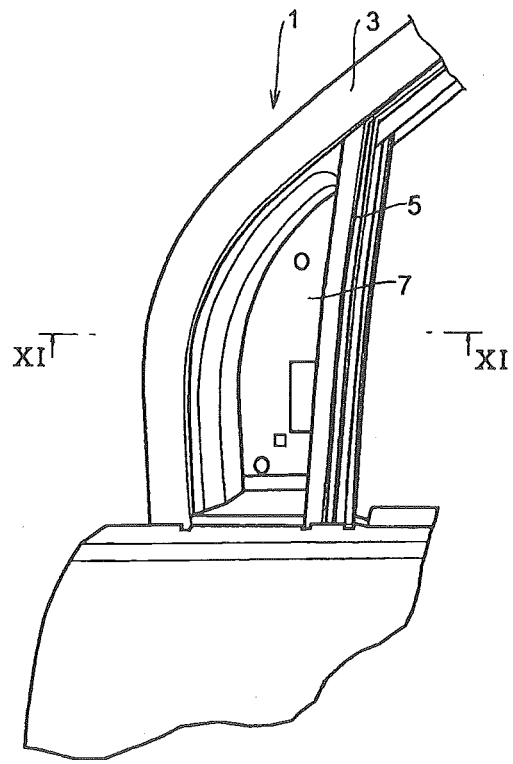

FIG.11 -BACKGROUND ART-
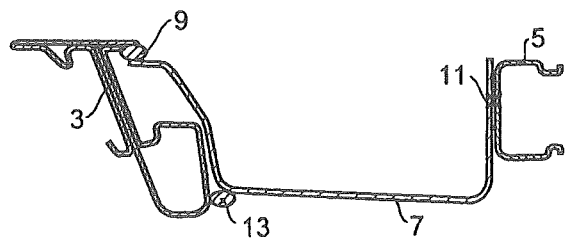
⇑ OUTSIDE OF VEHICLE
⇓ INSIDE OF VEHICLE

DOOR FRAME AND METHOD FOR MANUFACTURING SAME

TECHNICAL FIELD

The invention relates to a door frame for a vehicle and a method of manufacturing the same.

BACKGROUND ART

Generally, a door frame for a vehicle includes a sash body for supporting door glass and a door-frame component attached by welding to the sash body.

The door-frame component corresponds to a lock-device mounting bracket, a reinforcing material for reinforcing the door frame, a door-mirror mounting bracket, or the like.

As a structure for attaching the sash body and the door-frame component each other by welding, the structure shown in FIGS. 10 and 11 has been known. FIG. 10 is a front view of a mirror-mounting bracket of a door frame, and FIG. 11 is a cross-sectional view taken along line XI-XI of FIG. 10.

In FIG. 10, a front side of an upper sash 3 of a sash body 1 is provided with a division bar 5. A door-mirror mounting bracket (door frame part) 7 is attached in the space between the front side of the upper sash 3 and the division bar 5 by welding.

As shown in FIG. 11, a first weld bead 9 attaching the upper sash 3 and the bracket 7 and a second weld bead 11 attaching the division bar 5 and the bracket 7 are positioned at the outside of a vehicle, and a third weld bead 13 attaching the upper sash 3 and the bracket 7 is positioned at the inside of the vehicle. That is, the first and second weld beads 9 and 11 are welded from the outside of the vehicle, and the third weld bead 13 is welded from the inside of the vehicle (see e.g. Patent Document 1).

CITATION LIST

Patent Literature

Patent Literature 1: Japanese Unexamined Patent Publication No. 2005-053288

SUMMARY

Technical Problem

In the configuration shown in FIGS. 10 and 11, welding is performed from two sites, i.e. the inside and the outside of a vehicle. Thus, welding devices respectively placed on the inside and the outside of the vehicle, a welding device being able to move between the inside and the outside of the vehicle, or otherwise, a stationary welding device and a movable mechanism for oppositely moving a target object (sash body) to the stationary welding device is required, thereby causing a problem of increased cost.

Accordingly, an object of the present invention is to provide a door frame and a method of manufacturing the same, with reducing manufacturing cost.

Solution to Problem

In order to accomplish the object, according to an aspect of the present invention, provided is a door frame including a sash body having an upper sash and a vertical sash, and a door-frame component having a through-hole for welding, wherein the door-frame component is attached by welding to the sash body, and wherein weld beads are formed between the wall surfaces of the through-hole for welding and the sash body.

The through-hole for welding is a hole that is used to weld the door-frame component to the sash body, and a welding mark is formed in proximity to the through-hole for welding to attach the door-frame component to the sash body.

Further, in another aspect of the present invention, provided is method of manufacturing a door frame including a sash body having an upper sash and a vertical sash, and a door-frame component attached by welding to the sash body, the method including welding the door-frame component to the sash body through a through-hole for welding formed in the door-frame component from the opposite side of the sash body with respect to the door-frame component.

Effect of the Invention

According to the present invention, a door frame and a method of manufacturing the same, with reducing manufacturing cost, are provided.

BRIEF DESCRIPTION OF DRAWINGS

FIG. 8 is a cross-sectional view taken along line VIII-VIII of FIG. 6.

FIG. 9 is a cross-sectional view taken along line IX-IX of FIG. 6.

FIG. 10 is a front view of a mirror-mounting part of the door frame.

FIG. 11 is a cross-sectional view taken along line XI-XI of FIG. 10.

DESCRIPTION OF EMBODIMENTS

Exemplary embodiments of the present invention will now be described with reference to the accompanying drawings.

Figure 2:
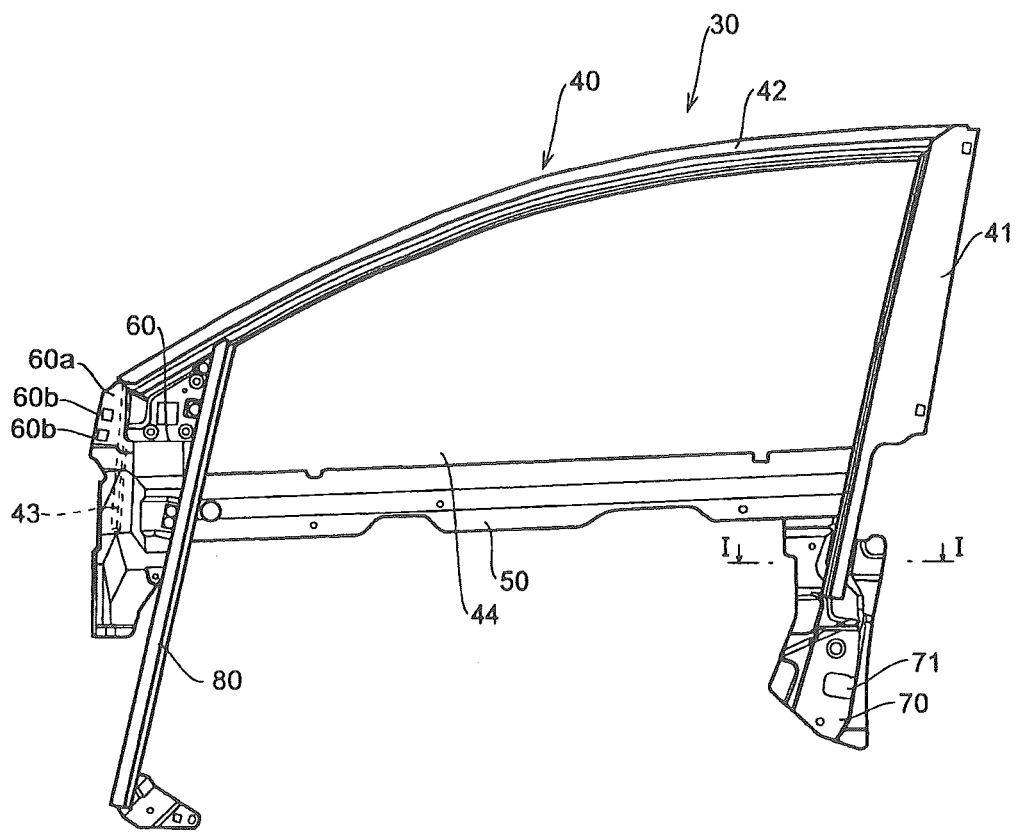
FIG. 2 is a front view of a door frame according to an embodiment of the present invention.

First, the entire configuration of a door frame of the present embodiment will be described, with reference to FIG. 2. FIG. 2 is a front view of the door frame of the present embodiment. The door frame 20 is a door frame for a front seat. In the following description, the left side of FIG. 2 indicates the front side and the right side of FIG. 2 indicates the rear side. In the meantime, the present invention is not limited to a door frame for a front seat, but it may be adapted to a door frame for a rear seat or a door frame for other applications.

The door frame 30 includes a sash body 40 and a door-frame component attached to the sash body 40.

The sash body 40 includes a rear sash (vertical sash) 41, an upper sash 42, a front sash (vertical sash) 43, and a division bar (vertical sash) 80.

The rear sash 41 is a member extending in a vertical direction. The upper sash 42 is attached to by welding to an upper edge of the rear sash 41 to form an upper edge of a door. The front sash 43 is attached by welding to a front end of the upper sash 42. The division bar 80 is attached by welding to the front side of the upper sash 42.

The door frame 30 of the present embodiment has a door-mirror mounting bracket 60, a lock-device mounting bracket 70, and a reinforcing member 50, as a door-frame component.

The door-mirror mounting bracket 60 is disposed in a space between the front sash 43 and the division bar 80, and is attached by welding to the front sash 43 and the division bar 80. The lock-device mounting bracket 70 is attached by welding to a lower portion of the rear sash 41.

The reinforcing member 50 is mounted such that it extends along an upper edge of a door panel (inner panel) which is not shown. The reinforcing member 50 is attached by welding to the division bar 80 and the rear sash 41 at its front and rear ends, respectively. In the meantime, the front end of the reinforcing member 50 may be attached by welding to the door-mirror mounting bracket 60 or the front sash 43.

The door-mirror mounting bracket 60 and the lock-device mounting bracket 70 is fixed to a door panel (inner panel) (not shown) which constitutes a section of a door body.

The sash body 40 is provided with a window opening 44 surrounded by the rear sash 41, the upper sash 42, and the division bar 80. A door glass which is not shown in the drawings moves up and down in the window opening.

The above-mentioned components of the door frame 30 are formed of light metal such as aluminum alloy or magnesium alloy.

Figure 1:
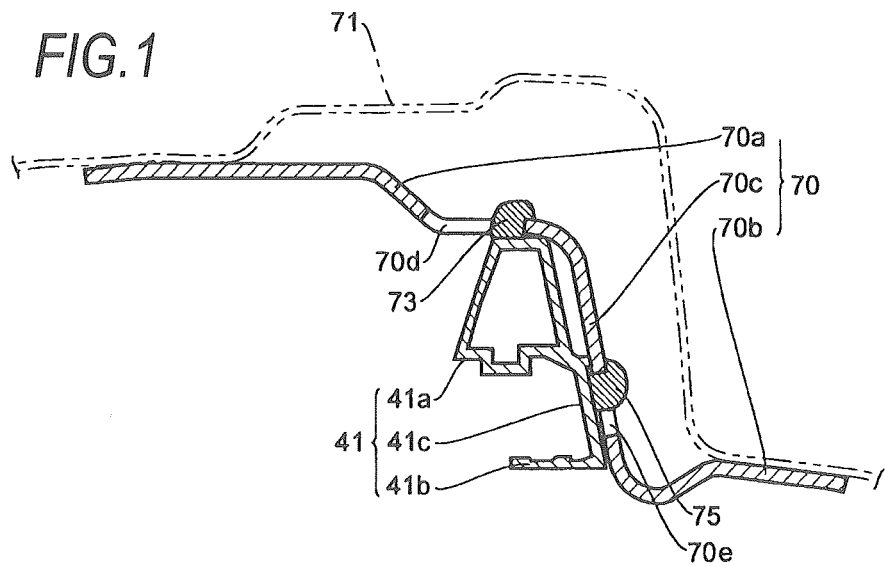
FIG. 1 is a cross-sectional view taken along line I-I of FIG. 2.
Figure 3:
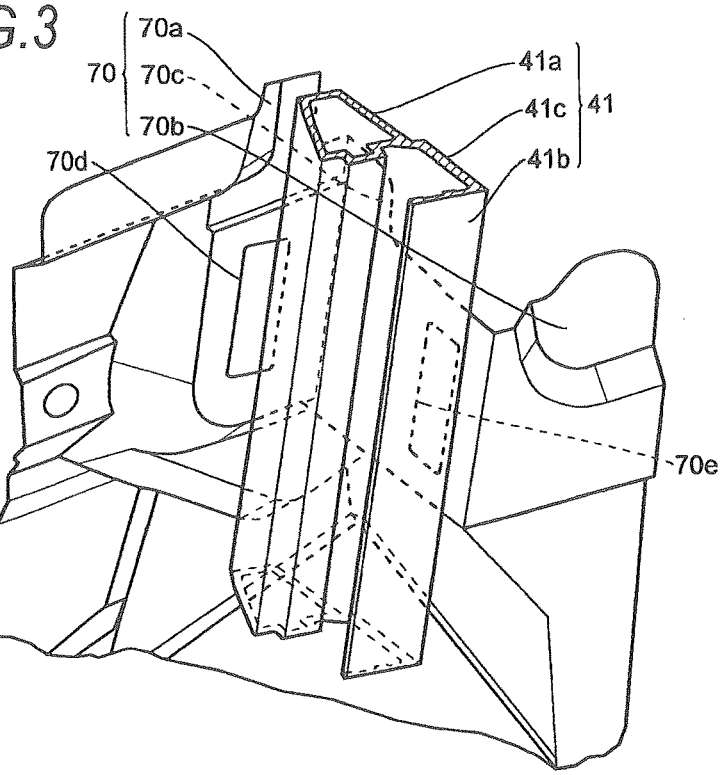
FIG. 3 is a perspective view of an attachment structure for a vertical sash and a lock-device mounting bracket as viewed from the outside of a vehicle.
Figure 4:
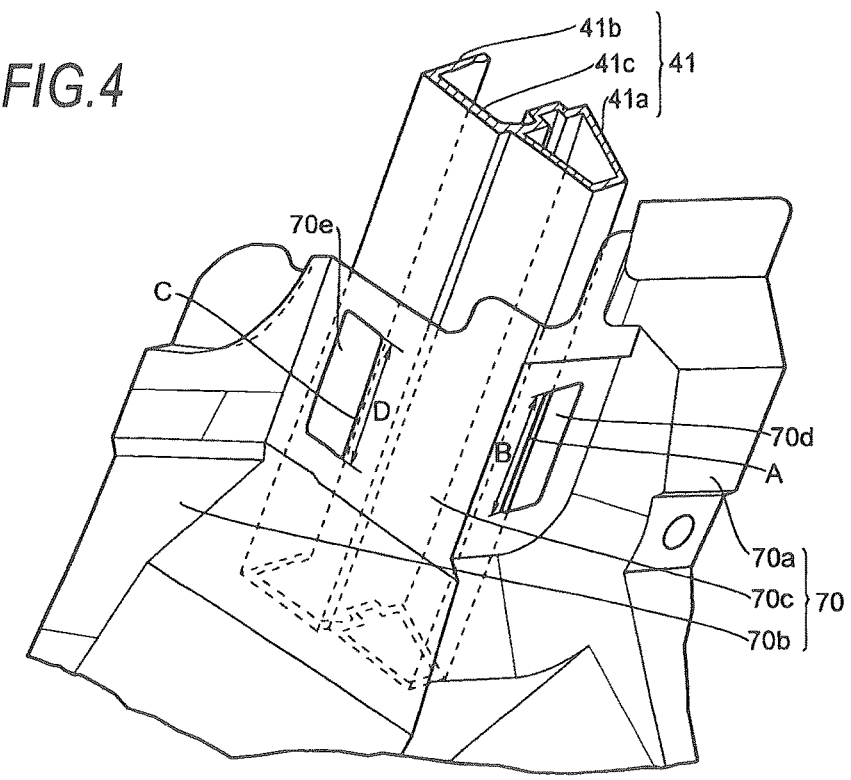
FIG. 4 is a perspective view of an attachment structure for a vertical sash and a lock-device mounting bracket as viewed from the inside of a vehicle.
Figure 5:
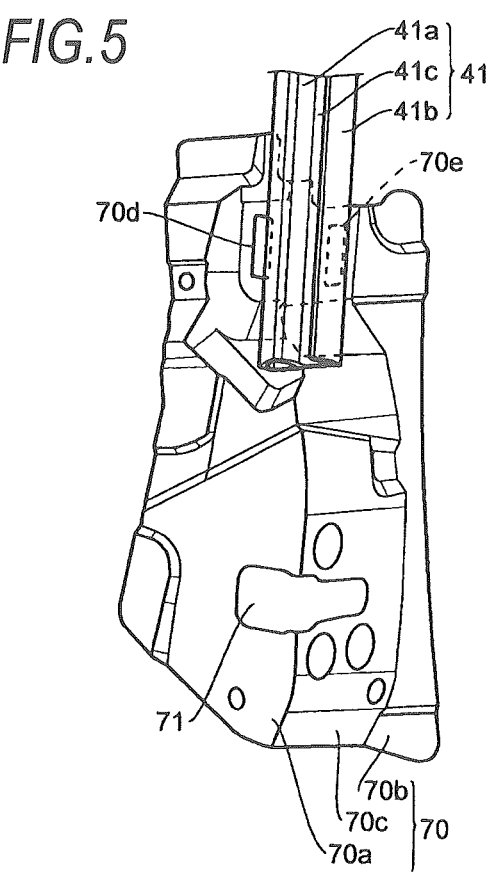
FIG. 5 is a perspective view of an attachment structure for a vertical sash and a lock-device mounting bracket as viewed from the outside of a vehicle.

Now an attachment structure for the rear sash 41 and the lock-device mounting bracket 70 of the sash body 40 will be described with reference to FIG. 1 and FIGS. 3 to 5. FIG. 1 is a cross-sectional view taken along line I-I of FIG. 2. FIG. 3 is a perspective view of an attachment structure for a vertical sash and a lock-device mounting bracket as viewed from the outside of a vehicle. FIG. 4 is a perspective view of an attachment structure for a vertical sash and a lock-device mounting bracket as viewed from the inside of a vehicle. FIG. 5 is a perspective view of an attachment structure for a vertical sash and a lock-device mounting bracket as viewed from the outside of a vehicle.

As shown in FIG. 1, the lock-device mounting bracket 70 is attached to the inside of the rear sash 41. The lock-device mounting bracket 70 has a first base part 70a extending in the longitudinal direction of a vehicle, a second base part 70b formed to be spaced apart from the first base part 70a, and a connection part 70c. The connection part 70c extends perpendicular to the longitudinal direction of the vehicle, and connects the first base part 70a and the second base part 70b. As shown in FIGS. 1 and 5, a portion of a corner between the first base part 70a and the connection part 70c is provided with a hole 71 into which a striker provided on the body side of the rear sash is fitted.

As shown in FIG. 1, the rear sash 41 has a hollow portion 41a having a closed cross-sectional shape, a fitting portion 41b exposed to the outside, and a connection portion 41c connecting the hollow portion 41a and the fitting portion 41b.

The lock-device mounting bracket 70 is attached to the rear sash 41 in a position such that the surface of the connection part 70c of the lock-device mounting bracket 70 is formed along the surface of the connection portion 41c of the rear sash 41, and the surface of the first base part 70a of the lock-device mounting bracket 70 is formed along the surface on the body side of the hollow portion 41a of the rear sash 41.

According to the present embodiment, the through-hole 70d for welding is formed in the first base part 70a, of the locking-mounting bracket 70, and through-hole 70e for welding is formed in the connection part 70c. The through-holes 70d and 70e of the present embodiment have an elongated rectangular shape along the longitudinal direction of the rear sash 41.

The lock-device mounting bracket 70 is welded to the rear sash 41 from the inside of a vehicle with using the through-holes 70d and 70e. Like this, the lock-device mounting bracket 70 can be welded to the rear sash 41 only from the inside of a vehicle.

The expression 'welding is performed from the inside of a vehicle' means that a welding machine is brought close to a target object from the inside of a vehicle in order to perform welding, and when welding from the inside is performed, a weld bead is formed to protrude towards the inside of the vehicle.

As compared with the conventional door frame in which welding from both the inside and the outside of a vehicle is required to attached a bracket 7 to a sash body 3, as shown in FIG. 11, according to the door frame of the present embodiment, since welding is performed only from the inside of a vehicle, it is capable of reducing the manufacturing cost.

According to the present embodiment, as shown in FIG. 4, welding is performed along the side A in the longitudinal direction of the rear sash 41 within the range B of the through-hole 70d. Further, welding is also performed along the side C in the longitudinal direction of the rear sash 41 within the range D of the through-hole 70e. Thus, elongated weld beads 73 and 75 (see FIG. 1) can be formed between the wall surfaces of the through-holes 70d and 70e for welding of the lock-device mounting bracket 70 and the rear sash 41. This can improve the strength of welding portions between the rear sash 41 and the lock-device mounting bracket. Further, the weld bead 75 is formed continuously in the longitudinal direction of the rear sash 41, further improving the welding strength.

Further, according to the present embodiment, when the lock-device mounting bracket 70 is abutted against the rear sash 41, a gap is provided between the rear sash 41 and the through-holes 70d and 70e of the lock-device mounting bracket 70. Because of this, when the lock-device mounting bracket 70 is welded to the rear sash 41, weld beads 73 and 74 are introduced into and formed in the gaps between the rear sash 41 and the lock-device mounting bracket 70. Thereby, the weld strength between the rear sash 41 and the lock-device mounting bracket 70 is improved.

Furthermore, when the sash body 40 and the door-frame component (the reinforcing member 50, the door-mirror mounting bracket 60, or the lock-device mounting bracket 70) are welded, it is preferably that welding is performed in a state where the rear sash 41 takes a longitudinally horizontal position. Thereby, even when a welding target is made of light metal, a weld bead does not flow down well during welding.

Figure 6:
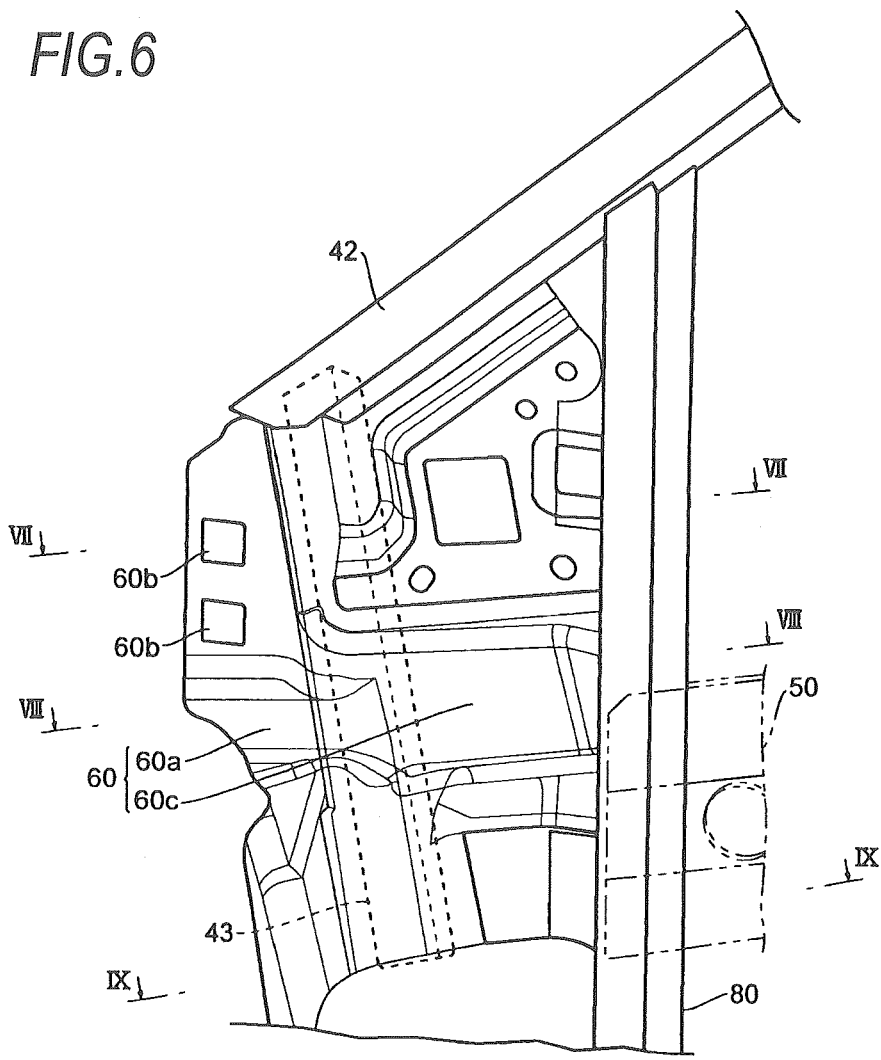
FIG. 6 is a perspective view showing a door-mirror mounting bracket and a front sash.
Figure 7:
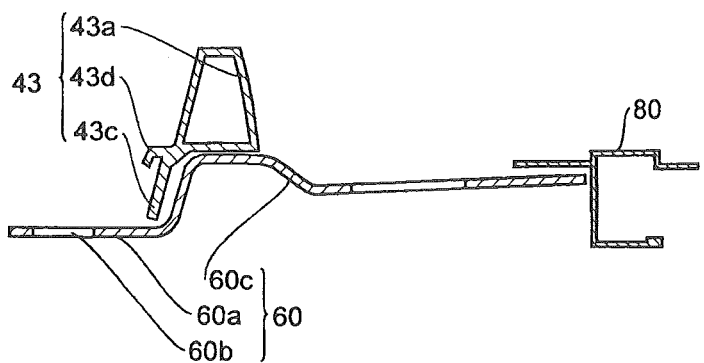
FIG. 7 is a cross-sectional view taken along line VII-VII of FIG. 6.

Next, a door-mirror mounting bracket will be described with reference to FIGS. 6 to 9. FIG. 6 is a perspective view showing a door-mirror mounting bracket and a front sash 43. FIG. 7 is a cross-sectional view taken along line VII-VII of FIG. 6. FIG. 8 is a cross-sectional view taken along line VIII-VIII of FIG. 6. FIG. 9 is a cross-sectional view taken along line IX-IX of FIG. 6.

As shown in FIGS. 7 to 9, the front sash 43 includes a hollow portion 43a having a closed cross-sectional shape, a support portion 43b (see FIG. 9), a connection portion 43c (see FIG. 9) connecting the hollow portion 43a and the support portion 43b, and a weatherstrip hook 43d (see FIG. 7) formed on the connection portion 43c.

As shown in FIG. 6, the door-mirror mounting bracket 60 is attached to the front sash 43 from the outside of a vehicle. The door-mirror mounting bracket 60 has a bracket body 60c disposed between the front sash 43 and the division bar 80, and a projecting portion 60a. The projecting portion 60a is formed on the front side of the bracket body 60c so that it extends forwards beyond the front sash 43.

As appeared from comparing FIGS. 7 and 9, the front sash 43 is not provided, on its upper portion, with the support portion 43b. Weatherstripping (not shown) is fixed by the weatherstrip hook 43d and the surface of the projecting portion 60a of the door-mirror mounting bracket 60. Further, the projecting portion 60a is provided with a through-hole 60b to which an end cap, weatherstripping, and garnish moulding are attached.

As appeared from comparing FIGS. 7 and 9, the front sash 43 is not provided with the support portion 43b and the weatherstrip hook 43d of the front sash 43 at a vertically-middle portion of the front sash.

As appeared from comparing FIGS. 7 and 9, the lower portion of the front sash 43 is not provided with the weatherstrip hook 43d of the front sash 43. The support portion 43b of the front sash 43 is placed to be abutted against the projecting portion 60a of the door-mirror mounting bracket 60 in order to support the door-mirror mounting bracket 60.

According to the above-mentioned configuration, the following effects can be obtained.

(1) The first base part 70a and the connection part 70c of the lock-device mounting bracket 70 are respectively provided with the through-hole 70d for welding and the through-hole 70e for welding. Thereby, the lock-device mounting bracket 70 can be welded to the rear sash 41 by using the through-holes 70d and 70e from the inside of a vehicle. That is, when the lock-device mounting bracket 70 is attached by welding to the rear sash 41, it is not required to perform welding from both the inside and the outside of a vehicle, thereby reducing manufacturing cost.

(2) When the rear sash 41 and the lock-device mounting bracket 70 are abutted against each other, a gap is provided between the rear sash 41 and the lock-device mounting bracket 70. Accordingly, when welding the rear sash 41 and the lock-device mounting bracket 70, weld beads are introduced into and formed in the gaps between the rear sash 41 and the lock-device mounting bracket 70, thereby improving welding strength between the rear sash 41 and the lock-device mounting bracket 70.

The present invention, however, is not limited to the above-mentioned embodiment. Although the above-mentioned embodiment has illustrated the welding between the rear sash 41 and the lock-device mounting bracket 70, the present invention is not limited thereto. For example, the present invention can also be adapted to welding between the rear sash 41 and the rear end of the reinforcing member 50, welding between the front sash 43 and the front end of the reinforcing member 50, and welding between the front sash 43 and the door-mirror mounting bracket 60.

Further, although the former embodiment has illustrated the welding of a single door-frame component to the sash body, the present invention is not limited thereto. For example, the present invention can also be adapted to welding of a plurality of door-frame components to the sash body.

For example, the present invention can be suitably adapted to a door frame in which a first door-frame component (e.g. a lock-device mounting bracket 70) is disposed on the inside of a sash body and a second door-frame component (e.g. a reinforcing member 50) is disposed on the outside of a sash body.

In such a door frame, if the door-frame components are not provided with through-hole for welding, it is required that the first door-frame component be welded to the sash body from the outside of a vehicle and the second door-frame component be welded to the sash body from the inside of the vehicle. In this case, it is required to provide a welding machine on both the inside and the outside of a vehicle, thereby increasing manufacturing cost.

However, when the present invention is adapted to such a door frame such that the first door-frame component is provided with a through-hole for welding, the first and second door-frame components can be welded to the sash body from the same side as follows.

That is, the first door-frame component is welded to the sash body through the through-hole for welding from one side (e.g. the inside of a vehicle) of the sash body with respect to the first door-frame component. Subsequently, the second door-frame component is also welded to the sash body from the same side (e.g. the inside of a vehicle) of the sash body with respect to the first door-frame component. In other words, the first door-frame component is welded to the sash body through the through-hole for welding from one side (e.g. the inside of a vehicle) of the sash body, and the second door-frame component is welded to the sash body from the same side (e.g. the inside of a vehicle) of the sash body. In this way, both the first and second door-frame components can be welded to the sash body from the same direction. Thereby, since a welding machine can only be provided on one side (e.g. the inside of a vehicle) of the sash body, manufacturing cost can be reduced.

Also, although the former embodiment has illustrated that the first door-frame component and second door-frame component are respectively provided to the sash body on the inside and the outside of a vehicle, the present invention is not limited thereto.

The present invention can also be applied to a door frame in which first and second door-frame components are arranged on the same side of the sash body.

In this case, a through-hole for welding is provided on both the first door-frame component and second door-frame component, and the first door-frame component and second door-frame component can be welded from the same side by using the through-holes for welding.

Otherwise, if the first door-frame component is welded to the sash body by using the through-hole for welding of the first door-frame component and the second door-frame component is welded to the sash body using its end, the present invention can also be applied to the door frame in which the first door-frame component and second door-frame components are arranged on the same side of the sash body.

There are few members interfering with a welding machine near the end of the second door-frame component. Thus, the second door-frame component is welded to the sash body by bring the welding machine close to the end of the second door-frame component from one side (e.g. the inside of a vehicle) of the sash body. Then, the first door-frame component is welded to the sash body by using the through-hole for welding provided in the first door-frame component from one side (e.g. the inside of a vehicle) of the sash body. Thereby, both the first door-frame component and second door-frame component can be welded to the sash body from the same side of the sash body.

The first door-frame component may be configured by a plurality of components, and second door-frame component may be configured by a plurality of components. For example, the present invention can also be applied to a door frame in which a lock-device mounting bracket 70 and a reinforcing member 50 are arranged on the inside of the sash body as a first door-frame component, and a door-mirror mounting bracket 60 is arranged on the outside of the sash body as a second door-frame component.

Further, if the sash body and a plurality of door-frame components are made of light metal such as aluminum or aluminum alloy, it is preferred that welding is performed in a state where the longitudinal direction of the sash body is directed in a horizontal direction to be lying down. When a door-frame component made of light metal is welded, a weld melt has a low viscosity and thus is easy to drop down. Therefore, it is preferred that a door-frame component is welded to the sash body from the top with being the sash body laid down in the horizontal direction.

Unlike the present invention, if the first and second door-frame components are required to be welded to the sash body from both side (e.g. the inside and the outside of a vehicle) of the sash body, when trying to weld the door-frame components to the sash body from the top in a state where the sash body is lying down, in order to suppress a dropping of the weld, it is required to turn the entire door frame upside down when welding is performed. That is, after the first door-frame component is welded to the sash body in a state where one side of the sash body faces upwards in order to perform the welding from one side of the sash body, the entire door frame is required to be turned upside down so that the other side of the sash body faces upwards, in order to weld the second door-frame component from the other side of the sash body. Since the door frame is relatively large, it is required to secure a space for turning the door frame, thereby requiring dedicated equipment. This is one factor to increase manufacturing cost for the door frame.

On the contrary, according to the present invention, the first and second door-frame components can be welded to the sash body from the same side of the sash body. Thereby, even in a door frame having a plurality of door-frame components of which attachment positions on the sash body are different, the door-frame components can be welded to the sash body from the top without turning the door frame upside down.

While the present invention has been described in detail with reference to preferred embodiments, it will be apparent to a person skilled in the art that various changes and modifications may be possible without departing from the spirit and scope of the present invention.

The present application is based on Japanese Patent Application (No. 2012-117162) filed on May 23, 2012, the contents of which are incorporated herein by reference.

INDUSTRIAL APPLICABILITY

According to the present invention, a door frame and a method of manufacturing the same, with reducing manufacturing cost, are provided.

REFERENCE NUMERALS LIST

41 Vertical sash (Sash body)
70 Lock-device mounting bracket (Door-frame component)
70e, 70d Through-hole
73, 75 Weld bead

What is claimed is:

1. A method of manufacturing a door frame including a sash body including an upper sash and a vertical sash and a door-frame component attached by welding to the sash body, the method comprising:
    forming a weld bead between a wall surface of a through-hole and the sash body by welding, from an opposite side of the sash body with respect to the door-frame component, the door-frame component to the sash body through the through-hole formed in the door-frame component.

2. The method according to claim 1, wherein the door-frame component includes a first door-frame component and a second door-frame component,
    wherein the first door-frame component is welded to the sash body from one side of the sash body with respect to the first door-frame component through the through-hole for welding formed in the first door-frame component, and
    wherein the second door-frame component is welded to the sash body from the one side of the sash body with respect to the first door-frame component.

3. The method according to claim 1, wherein the weld bead is formed along a longitudinal direction of the sash body.

4. The method according to claim 1, wherein the weld bead is formed over the wall surface of the through-hole and the sash body by welding.

5. The method according to claim 1, wherein the door-frame component includes a first door-frame component and a second door-frame component,
    wherein the first door-frame component is welded to the sash body from one side of the sash body with respect to the first door-frame component.

6. The method according to claim 1, wherein the door-frame component includes a first door-frame component and a second door-frame component,
    wherein the first door-frame component is welded to the sash body from one side of the sash body with respect to the first door-frame component through the through-hole for welding formed in the first door-frame component.

7. The method according to claim 6, wherein the second door-frame component is welded to the sash body.

8. The method according to claim 1, wherein the door-frame component includes a first door-frame component and a second door-frame component,
    wherein the first door-frame component is welded to the sash body from one side of the sash body with respect to the first door-frame component, and
    wherein the second door-frame component is welded to the sash body from the one side of the sash body with respect to the first door-frame component.

* * * * *